US012597673B2

(12) United States Patent
Sato et al.

(10) Patent No.: US 12,597,673 B2
(45) Date of Patent: Apr. 7, 2026

(54) BATTERY PACK AND ELECTRONIC DEVICE

(71) Applicant: MURATA MANUFACTURING CO., LTD., Kyoto (JP)

(72) Inventors: Ken Sato, Kyoto (JP); Kenichi Ozawa, Kyoto (JP); Masashi Sato, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 703 days.

(21) Appl. No.: 17/988,206

(22) Filed: Nov. 16, 2022

(65) Prior Publication Data

US 2023/0071591 A1    Mar. 9, 2023

Related U.S. Application Data

(63) Continuation of application No. PCT/JP2021/017517, filed on May 7, 2021.

(30) Foreign Application Priority Data

May 21, 2020    (JP) ................................. 2020-088608

(51) Int. Cl.
*H01M 50/284*        (2021.01)
*H01M 50/109*        (2021.01)
(Continued)

(52) U.S. Cl.
CPC ....... *H01M 50/284* (2021.01); *H01M 50/109* (2021.01); *H01M 50/119* (2021.01);
(Continued)

(58) Field of Classification Search
CPC ............. H01M 50/202; H01M 50/296; H01M 50/284; H01M 50/109
See application file for complete search history.

(56) References Cited

U.S. PATENT DOCUMENTS

| | | | | |
|---|---|---|---|---|
| 3,907,593 A | * | 9/1975 | Marincic | ................. H01M 6/14 |
| | | | | 429/208 |
| 2006/0214631 A1 | * | 9/2006 | Yoon | ................... H01M 50/249 |
| | | | | 320/112 |

(Continued)

FOREIGN PATENT DOCUMENTS

| | | |
|---|---|---|
| JP | H05008865 U | 2/1993 |
| JP | 2012190759 A | 10/2012 |

(Continued)

OTHER PUBLICATIONS

Chinese Office Action for corresponding CN Application No. 202180036272.5, dated Apr. 3, 2025. (3 pages).

(Continued)

*Primary Examiner* — Kenneth J Douyette

(74) *Attorney, Agent, or Firm* — K&L Gates LLP

(57) ABSTRACT

A battery pack includes a secondary battery and a circuit board, in which the secondary battery includes a metal exterior part, a first external terminal disposed at a center part of an end surface of the metal exterior part, and a second external terminal disposed so as to surround a periphery of the first external terminal, and the circuit board includes a first connection part connected to the first external terminal and a second connection part connected to the second external terminal; the battery pack including an insulating part that insulates the first connection part from the second connection part, the first connection part and the second connection part being disposed in an identical plane.

10 Claims, 9 Drawing Sheets

(51) Int. Cl.

| | |
|---|---|
| *H01M 50/119* | (2021.01) |
| *H01M 50/202* | (2021.01) |
| *H01M 50/296* | (2021.01) |
| *H01M 50/55* | (2021.01) |
| *H01M 50/588* | (2021.01) |
| *H01M 50/593* | (2021.01) |

(52) U.S. Cl.
CPC ....... *H01M 50/202* (2021.01); *H01M 50/296* (2021.01); *H01M 50/55* (2021.01); *H01M 50/588* (2021.01); *H01M 50/593* (2021.01); *H01M 2220/30* (2013.01)

(56) References Cited

U.S. PATENT DOCUMENTS

| | | | |
|---|---|---|---|
| 2014/0050948 A1 | 2/2014 | Hashimoto et al. | |
| 2015/0349388 A1* | 12/2015 | Haering .............. | H01M 50/109 29/623.2 |

FOREIGN PATENT DOCUMENTS

| | | | |
|---|---|---|---|
| JP | 2014022122 A | 2/2014 | |
| WO | 2012147375 A1 | 11/2012 | |

OTHER PUBLICATIONS

Chinese Search Report for corresponding CN Application No. 202180036272.5. (2 pages).
International Search Report of corresponding PCT application PCT/JP2021/017517, dated Jul. 20, 2021.

\* cited by examiner

WEARABLE TERMINAL
630

632

BATTERY PACK AND ELECTRONIC DEVICE

CROSS REFERENCE TO RELATED APPLICATIONS

The present application is a continuation of PCT patent application no. PCT/JP2021/017517, filed on May 7, 2021, which claims priority to Japanese patent application no. JP2020-088608, filed on May 21, 2020, the entire contents of which are incorporate herein by reference.

BACKGROUND

The present application relates to a battery pack and an electronic device.

A coin-type secondary battery which is a secondary battery having a coin shape is known. For example, a coin type secondary battery is described in which a positive electrode terminal and a negative electrode terminal are respectively provided on opposite end surfaces, and a potential of one polarity is routed by a flexible printed circuit (FPC).

SUMMARY

The present application relates to a battery pack and an electronic device.

Referring to the secondary battery described in the Background section, because the potential of one polarity is routed from the side surface of the coin-type secondary battery by the FPC, the size of the coin-type secondary battery increases. In addition, depending on the connection method, the coin-type secondary battery needs to be reversed, causing a risk that the assembly work efficiency is deteriorated. In view of the above, it is conceivable to provide a positive electrode terminal and a negative electrode terminal on one end surface of the coin-type secondary battery. However, because both the positive electrode terminal and the negative electrode terminal are disposed on one end surface, the insulation needs to be secured appropriately.

Therefore, the present application relates to providing a battery pack and an electronic device that can appropriately secure the insulation in a configuration in which both a positive electrode terminal and a negative electrode terminal are disposed on one end surface according to an embodiment.

The present application relates to a battery pack including:

a secondary battery; and a circuit board, in which the secondary battery includes:

a metal exterior part;

a first external terminal disposed at a center part of an end surface of the metal exterior part; and a second external terminal disposed so as to surround a periphery of the first external terminal, and the circuit board includes:

a first connection part connected to the first external terminal; and a second connection part connected to the second external terminal, the battery pack comprising an insulating part that insulates the first connection part from the second connection part, the first connection part and the second connection part being disposed in an identical plane.

The present application may be an electronic device including the battery pack described above.

According to an embodiment of the present application, the insulation can be appropriately ensured in a configuration in which both the positive electrode terminal and the negative electrode terminal are disposed on one end surface. Note that the contents of the present application are not to be construed as being limited by the effects exemplified in the present description.

DETAILED DESCRIPTION

Figure 1:
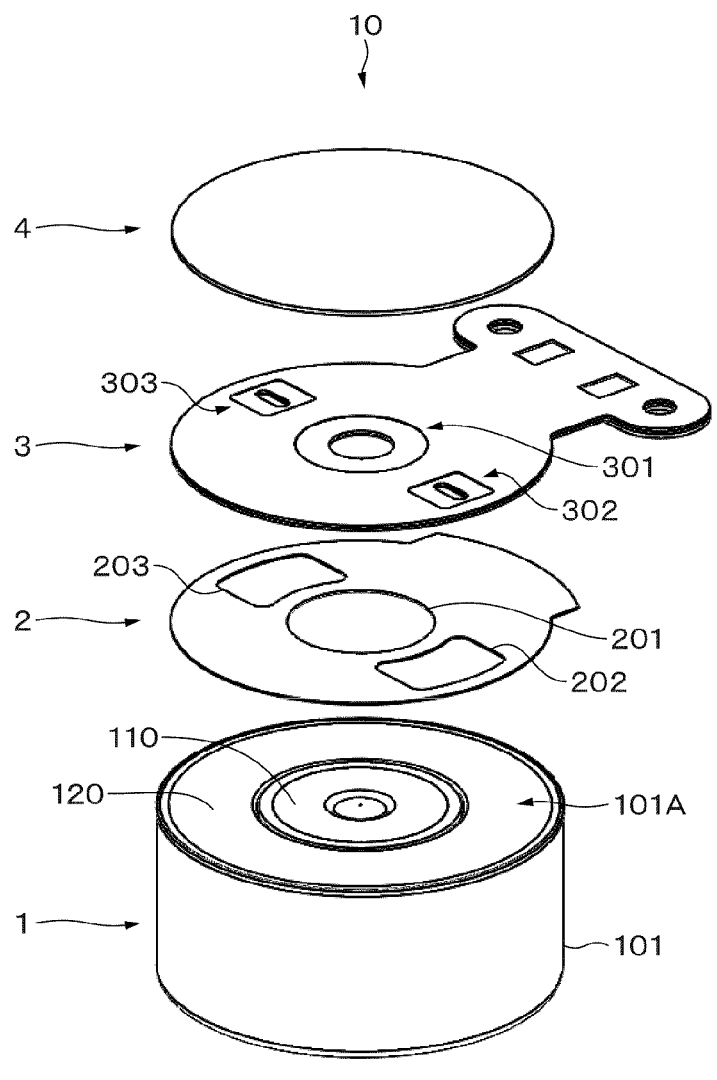
FIG. 1 is an exploded perspective view of a battery pack according to an embodiment.

Hereinafter, the present application is described in further detail including with reference to the drawings and preferred examples according to an embodiment and where the present application is not limited thereto.

Note that members shown in the claims are not specified as members of an embodiment. In particular, the scope of the present application is not intended to be limited to the description of dimensions, materials, and shapes, relative arrangements, directions such as up, down, left, and right of the constituent members described in an embodiment unless otherwise specified, and is merely an example for description. Note that sizes, positional relationships, and the like of the members illustrated in the respective drawings may be exaggerated for clarity of description, and only a part of reference numerals may be illustrated or a part thereof may be simplified in order to prevent the illustration from being complicated. Furthermore, in the following description, the same names and reference numerals indicate the same or similar members, and redundant descriptions are appropriately omitted. Furthermore, each element constituting the present application may have an aspect in which a plurality of elements is formed of the same member and one member serves as a plurality of elements, or conversely, a function of one member may be shared and realized by a plurality of members.

Figure 2:
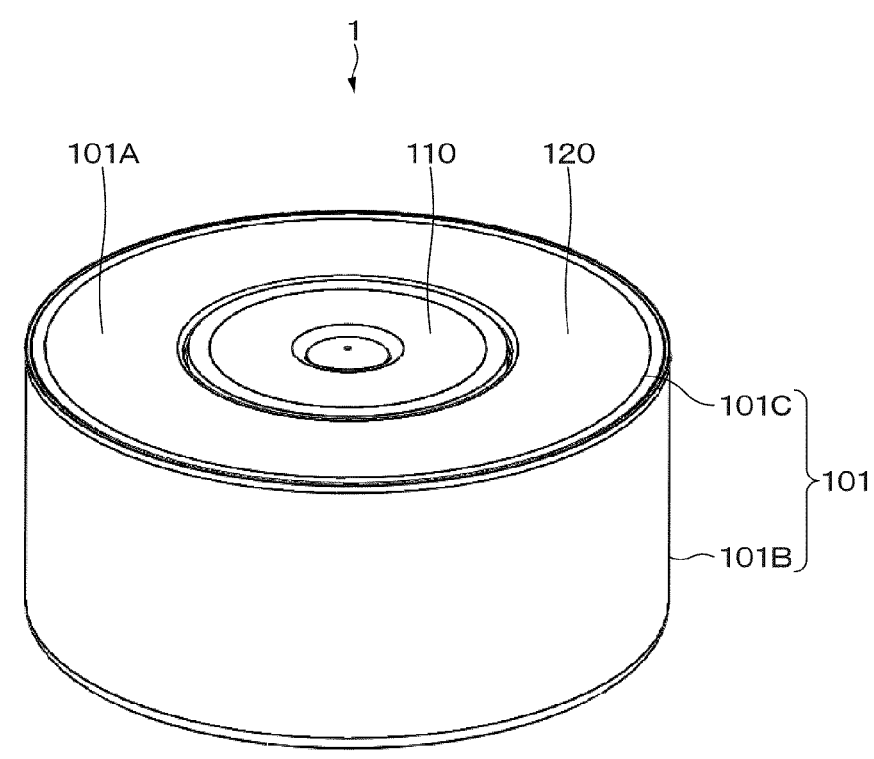
FIG. 2 is a diagram showing an exterior appearance example of a secondary battery according to an embodiment.
Figure 3:
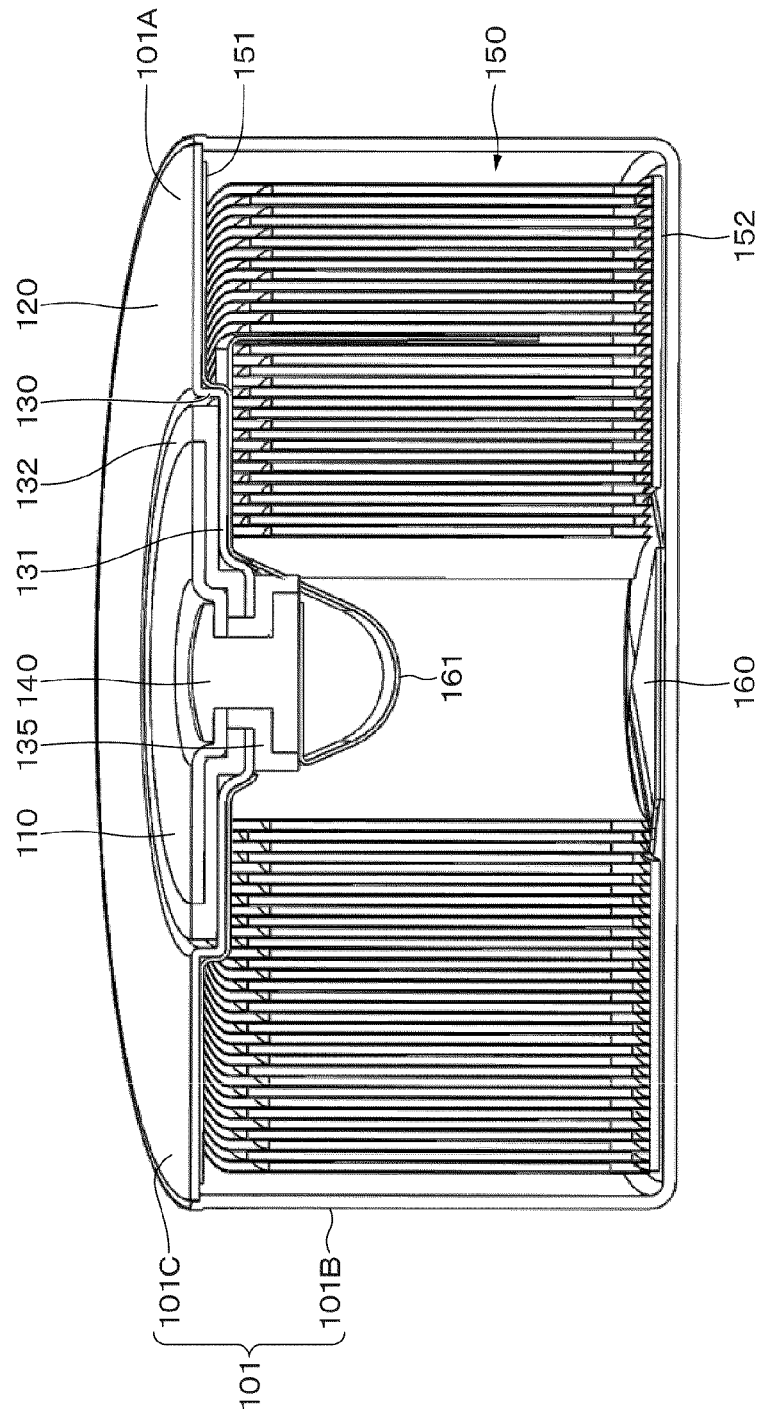
FIG. 3 is a diagram to be referred to when an internal configuration example of the secondary battery according to an embodiment is described.
Figure 4:
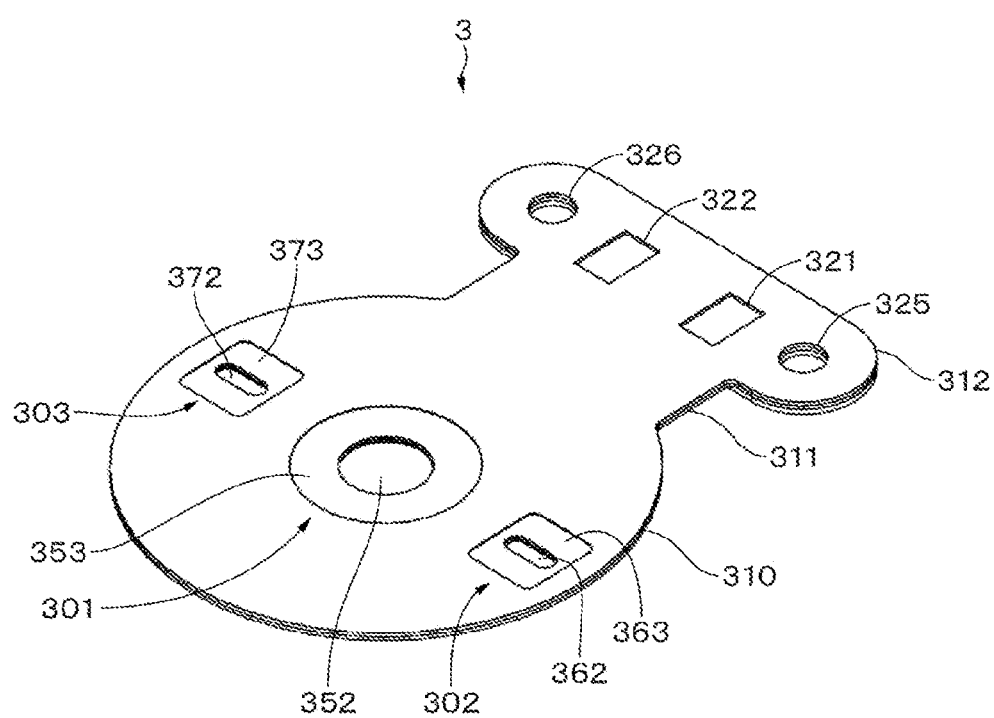
FIG. 4 is a diagram to be referred to when a configuration example of an FPC according to an embodiment is described.
Figure 5:
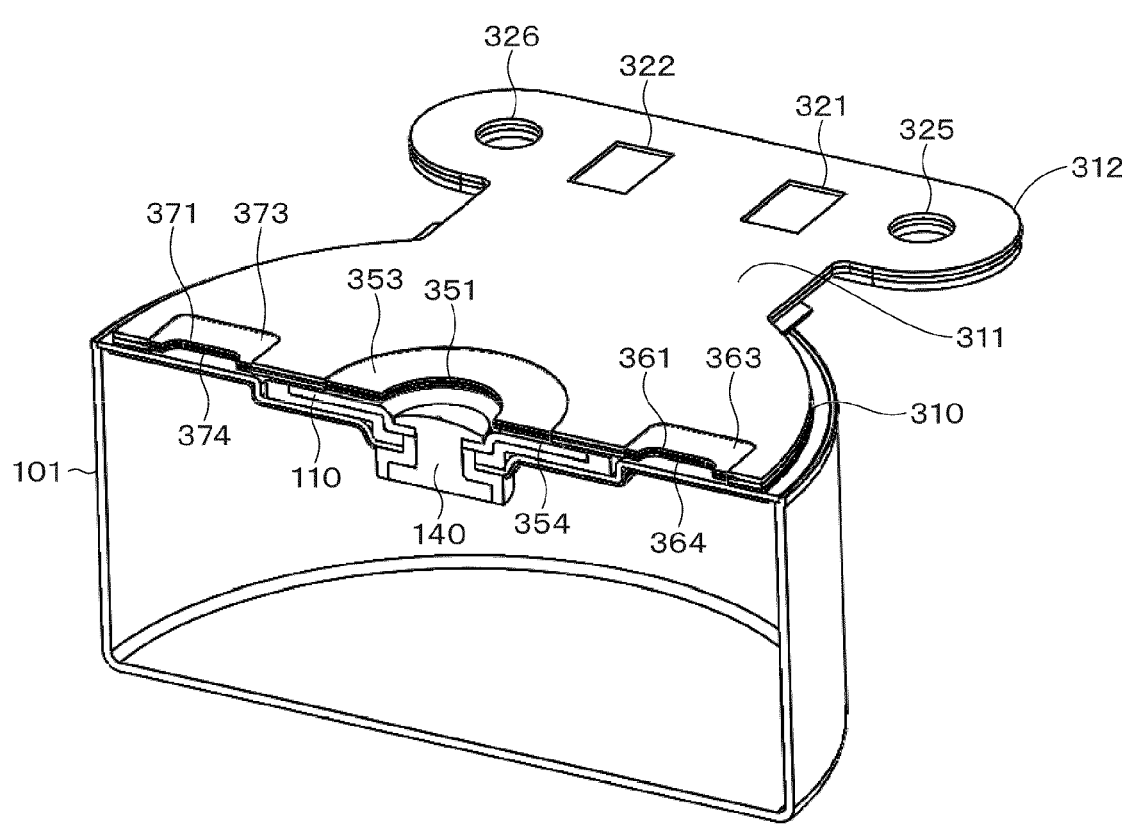
FIG. 5 is a sectional view of a half portion of the battery pack according to an embodiment.
Figure 6:
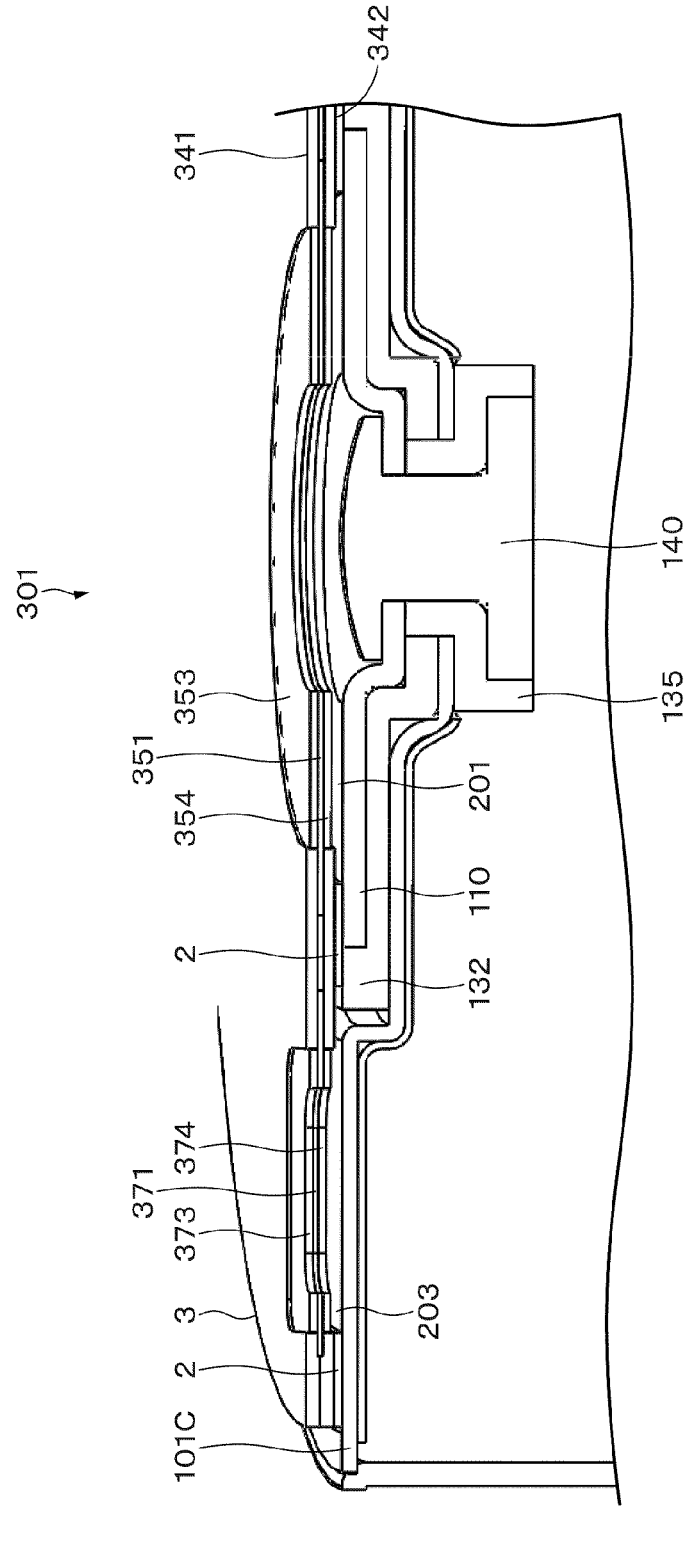
FIG. 6 is a diagram in which a section of a portion of the battery pack according to an embodiment is enlarged.

A configuration example of a battery pack according to an embodiment is described with reference to FIGS. 1 to 6. FIG. 1 is an exploded perspective view of a battery pack according to an embodiment. FIG. 2 is a diagram showing an exterior appearance example of the secondary battery according to an embodiment. FIG. 3 is a diagram to be referred to when an internal configuration example of the secondary battery according to an embodiment is described. FIG. 4 is a diagram to be referred to when a configuration example of an FPC according to an embodiment is described. FIG. 5 is a sectional view of a half portion of the battery pack according to an embodiment. FIG. 6 is a diagram in which a section of a portion of the battery pack according to an embodiment is enlarged. In the present description, the battery pack refers to a battery pack having a configuration in which a circuit board is connected to a secondary battery.

As shown in FIG. 1, a battery pack (battery pack 10) according to an embodiment includes a secondary battery 1, a first insulating plate 2 which is an example of an insulating part, an FPC 3 which is an example of a circuit board, and a second insulating plate 4 which is an example of another insulating part. The secondary battery 1 has a metal exterior part 101 having a columnar shape. The first insulating plate 2, the FPC 3, and the second insulating plate 4 are sequentially stacked on an end surface 101A, which is one end surface (the upper surface in FIG. 1) of the metal exterior part 101, and are connected by an appropriate method, whereby the battery pack 10 according to an embodiment is completed (see FIG. 5).

A positive electrode terminal 110, which is an example of a first external terminal, is disposed in a center part (a portion near the center) of the end surface 101A of the metal exterior part 101. A negative electrode terminal 120, which is an example of a second external terminal, is disposed so as to surround the periphery of the positive electrode terminal 110.

The first insulating plate 2 has a size slightly smaller than the end surface 101A of the metal exterior part 101, and has a substantially circular shape as a whole. As the first insulating plate 2, a polyimide (PI) film or non-woven fabric can be used. In the case of using the non-woven fabric, non-woven fabric containing aramid fibers is more preferable from the viewpoint of insulating properties and flame retardancy. The first insulating plate 2 has a circular opening 201 in the center part and rectangular openings 202 and 203 provided around the opening 201. The first insulating plate 2 is attached to the end surface 101A of the metal exterior part 101 by bonding or the like. In an embodiment, the opening 201 corresponds to a third opening provided at a location corresponding to an opening 352 described later. The openings 202 and 203 each correspond to a fourth opening. The opening 202 is provided at a position corresponding to an opening 362 described later, and the opening 203 is provided at a position corresponding to an opening 372 described later.

The FPC 3 includes a connection part 301 provided in the center part and connection parts 302 and 303 provided around the connection part 301. The connection part 301 is connected to the positive electrode terminal 110 through the opening 201. The connection part 302 is connected to the negative electrode terminal 120 through the opening 202. The connection part 303 is connected to the negative electrode terminal 120 through the opening 203. In an embodiment, the connection part 301 corresponds to the first connection part, and the connection parts 302 and 303 correspond to the second connection part.

The second insulating plate 4 covers at least a part of the surface of the FPC 3 opposite to the surface in contact with the first insulating plate 2. Specifically, the second insulating plate 4 has a size enough to cover the connection parts 301, 302, and 303, and has a circular shape. Because the connection part 301 connected to the positive electrode terminal

110 and the connection parts 302 and 303 connected to the negative electrode terminal 120 are concealed by the second insulating plate 4, the safety of the battery pack 10 can be secured. As the second insulating plate 4, a polyimide film or non-woven fabric can be used. In the case of using the non-woven fabric, non-woven fabric containing aramid fibers is more preferable from the viewpoint of insulating properties and flame retardancy.

Next, details of the secondary battery 1 according to an embodiment are described. As described above, the secondary battery 1 has the metal exterior part 101. As shown in FIG. 2, the metal exterior part 101 includes, for example, a hollow columnar metal exterior part 101B whose upper side is opened and a lid-like metal exterior part 101C disposed at the open end of the metal exterior part 101B. The metal exterior part 101C forms the end surface 101A described above. For example, the peripheral edge of the metal exterior part 101B and the peripheral edge of the metal exterior part 101C are welded together.

As shown in FIG. 3, in the metal exterior part 101C, a step 130 is formed at a predetermined position in a direction from the peripheral edge toward the center part, and the center part side of the step is a circular recess 131. A circular opening is formed at the center of the recess 131. The positive electrode terminal 110 described above is disposed in the recess 131 with an insulating member 132 interposed therebetween. The positive electrode terminal 110 and the insulating member 132 also have a circular shape, and have a circular opening at the center part. The openings of the positive electrode terminal 110, the insulating member 132, and the recess 131 are disposed so as to communicate with each other in the vertical direction, and a rivet 140 is driven into the opening and crimped. The rivet 140 has, for example, an H-shaped section. An insulating member 135 is disposed between the rivet 140 and each of the negative electrode terminal 120 and the insulating member 132.

A battery element 150 is housed in the metal exterior part 101. A top insulator 151 is disposed on the upper side of the battery element 150, and a bottom insulator 152 is disposed on the lower side thereof. The negative electrode side of the battery element 150 is connected to the bottom surface of the metal exterior part 101B via a negative electrode lead 160 by welding or the like. With this connection, the whole of the metal exterior part 101 has a negative polarity and functions as the negative electrode terminal 120. The positive electrode side of the battery element 150 is connected to the lower side of the rivet 140 via a positive electrode lead 161 by welding or the like. With this connection, the positive electrode terminal 110 abutting to the rivet 140 has a positive polarity.

As the positive electrode terminal 110, for example, a nickel plate can be used. As the metal exterior part 101 functioning as the negative electrode terminal 120, a stainless steel exterior part in which a portion of the end surface 101A is plated with nickel can be used. As material of the rivet 140, for example, aluminum can be used. Note that these materials are examples, and are not limited to the exemplified materials.

Note that the terminal in the positive electrode terminal or the negative electrode terminal in the present description is not limited to a physical contact, and only needs to have a configuration of having a positive or negative polarity. For example, the terminal may have a case shape similarly to the metal exterior part 101 in an embodiment.

Next, details of the FPC 3 according to an embodiment is described. As shown in FIGS. 4 and 5, the FPC 3 includes a circular base part 310, a rectangular intermediate part 311 extending from a predetermined peripheral edge of the base part 310, and a long elliptical distal end part 312 located at the distal end of the intermediate part 311, and has a configuration in which these are integrally formed.

The connection part 301 described above is formed at the center part of the base part 310. In addition, the connection parts 302 and 303 described above are formed around the connection part 301 provided in the base part 310. In this manner, the connection parts 301, 302, and 303 are disposed in an identical plane.

In addition, a connection terminal such as a copper plate connected to an external device is formed at the distal end part 312. For example, a connection terminal 321 and a connection terminal 322 are formed at the distal end part 312. In this manner, the connection terminal 321 and the connection terminal 322 are provided on an identical substrate with the FPC 3.

The connection terminal 321 is connected to the connection part 301 by a predetermined pattern. The connection terminal 321 functions as an output terminal on the positive electrode side. The connection terminal 322 is connected to at least one of the connection part 302 and the connection part 303 by a predetermined pattern. The connection terminal 322 functions as an output terminal on the negative electrode side. Note that a connector may be provided at the distal end part 312. Circular holes 325 and 326 are respectively formed near opposite ends of the distal end part 312. The hole 325 and the hole 326 are holes for positioning the secondary battery 1 and the FPC 3. For example, by inserting a pin-shaped jig into the hole 325 and the hole 326, the secondary battery 1 and the FPC 3 are positioned.

As shown in FIG. 6, the FPC 3 includes, for example, polyimide sheets 341 and 342 laminated in two layers. The connection part 301 includes a tab 351. As the tab 351, for example, a copper foil or nickel tab can be used. The tab 351 has a circular opening 352 (see FIG. 4) in the center. The tab 351 is sandwiched and supported in vicinity of the peripheral edge by the polyimide sheets 341 and 342. As shown in FIGS. 4 and 6, preliminary solder 353 is provided on the upper side of the exposed portion (portion not sandwiched by the polyimide sheets 341 and 342) of the tab 351, and preliminary solder 354 is provided on the lower side thereof. The preliminary solder is a small amount of solder provided in advance on the portion to be soldered in order to improve solderability, and for example, a low melting point solder paste is used.

The connection part 302 includes a tab 361. As the tab 361, for example, a copper foil or nickel tab can be used. The tab 361 has a long elliptical opening 362 (see FIG. 4) in the center. The tab 361 is sandwiched and supported in vicinity of the peripheral edge by the polyimide sheets 341 and 342. As shown in FIG. 5, preliminary solder 363 is provided on the upper side of the exposed portion of the tab 361, and preliminary solder 364 is provided on the lower side thereof.

The connection part 303 includes a tab 371. As the tab 371, for example, a copper foil or nickel tab can be used. The tab 371 has a long elliptical opening 372 (see FIG. 4) in the center. The tab 371 is sandwiched and supported in vicinity of the peripheral edge by the polyimide sheets 341 and 342. As shown in FIGS. 4 and 6, preliminary solder 373 is provided on the upper side of the exposed portion of the tab 371, and preliminary solder 374 is provided on the lower side thereof.

In an embodiment, the opening 352 corresponds to a first opening. Further, the openings 362 and 372 each correspond to a second opening.

Next, an example of a method of manufacturing the battery pack 10 is described. First, the first insulating plate 2 is attached to the end surface 101A of the secondary battery 1 by bonding or the like. Then, for example, by inserting a pin-shaped jig into the hole 325 and the hole 326, the FPC 3 is positioned. As shown in FIG. 6, in a state where the FPC 3 is positioned, the opening 352 communicates with the opening 201 of the first insulating plate 2, and the tip of the rivet 140 can be seen through the communicating portion. In addition, the bottom surface of the preliminary solder 354 and the positive electrode terminal 110 face each other with a facing gap corresponding to the thickness of the first insulating plate 2. Further, in a state where the FPC 3 is positioned, the opening 362 communicates with the opening 202 of the first insulating plate 2, and a part of the metal exterior part 101C can be seen through the communicating portion. In addition, the bottom surface of the preliminary solder 364 and the portion of the part of the metal exterior part 101C face each other with a facing gap corresponding to the thickness of the first insulating plate 2. Further, as shown in FIG. 6, in a state where the FPC 3 is positioned, the opening 372 communicates with the opening 203 of the first insulating plate 2, and a part of the metal exterior part 101C can be seen through the communicating portion. In addition, the bottom surface of the preliminary solder 374 and the portion of the part of the metal exterior part 101C face each other with a facing gap corresponding to the thickness of the first insulating plate 2.

In a state where the FPC 3 is positioned, for example, a heat tip is pressed against the portion of the preliminary solder 353. As a result, the preliminary solder 353 is melted, and the heat of the heat tip propagates to the preliminary solder 354 on the lower side to melt the preliminary solder 354. Molten solder flows downward. After a certain time, the heat tip is separated, and the molten solder is solidified. Accordingly, the tab 351 and the positive electrode terminal 110 are solder-connected to each other.

Similarly, in a state where the FPC 3 is positioned, for example, the heat tip is pressed against the portion of the preliminary solder 363. Similarly to the solder connection in the connection part 301 described above, the tab 361 and the metal exterior part 101C, that is, the negative electrode terminal 120, are solder-connected. Similarly, in a state where the FPC 3 is positioned, for example, the heat tip is pressed against the portion of the preliminary solder 373. Similarly to the solder connection in the connection part 301 described above, the tab 371 and the metal exterior part 101C, that is, the negative electrode terminal 120, are solder-connected.

In the state shown in FIG. 5, that is, after the solder connection is completed, the second insulating plate 4 is attached to the upper surface of the FPC 3 by bonding or the like. As described above, the battery pack 10 is completed.

As described above, the connection part 301 is connected to the connection terminal 321 by a predetermined pattern. As a result, the output on the positive electrode side can be output to the outside via the connection part 301 solder-connected to the positive electrode terminal 110 and the connection terminal 321. In addition, at least one of the connection part 302 and the connection part 303 is connected to the connection terminal 322 by a predetermined pattern. As a result, the output on the negative electrode side can be output to the outside via at least one of the connection parts 302 and 303 solder-connected to the negative electrode terminal 120 and the connection terminal 322. Note that the intermediate part 311 of the FPC 3 may be bent when the connection terminals 321 and 322 are connected to an external device.

When the connection part 301 is connected to the positive electrode terminal 110, molten solder flows to cause the connection part 301 to be also solder-connected to the negative electrode terminal 120, which causes a risk of a short circuit. Meanwhile, when the connection parts 302 and 303 are connected to the negative electrode terminal 120, molten solder flows to cause the connection parts 302 and 303 to be also solder-connected to the positive electrode terminal 110, which causes a risk of a short circuit. However, in an embodiment, the first insulating plate 2 is disposed between the connection part 301 and the connection part 302 and between the connection part 301 and the connection part 303. Therefore, the occurrence of short circuit due to the molten solder flowing to the other electrode side can be prevented.

According to an embodiment, the following effects can be obtained.

The potentials of the positive electrode and the negative electrode can be drawn from the identical plane. The size of the FPC 3 can be reduced, and the battery pack 10 can be downsized.

When the FPC 3 is connected, the secondary battery 1 does not need to be reversed, and the process can be simplified.

The positive electrode terminal 110 and the negative electrode terminal 120 can be appropriately insulated from each other by the first insulating plate 2. This also eliminates the need for winding an insulating tape around the secondary battery 1.

When the FPC 3 is held by a tube and components are mounted on the surface held by the tube, the holding force of the FPC 3 decreases, but according to an embodiment, this problem does not occur, and thus impact resistance is improved.

Although an embodiment of the present application has been specifically described herein, the present application is not limited thereto, and various modifications are contemplated.

Figure 7:
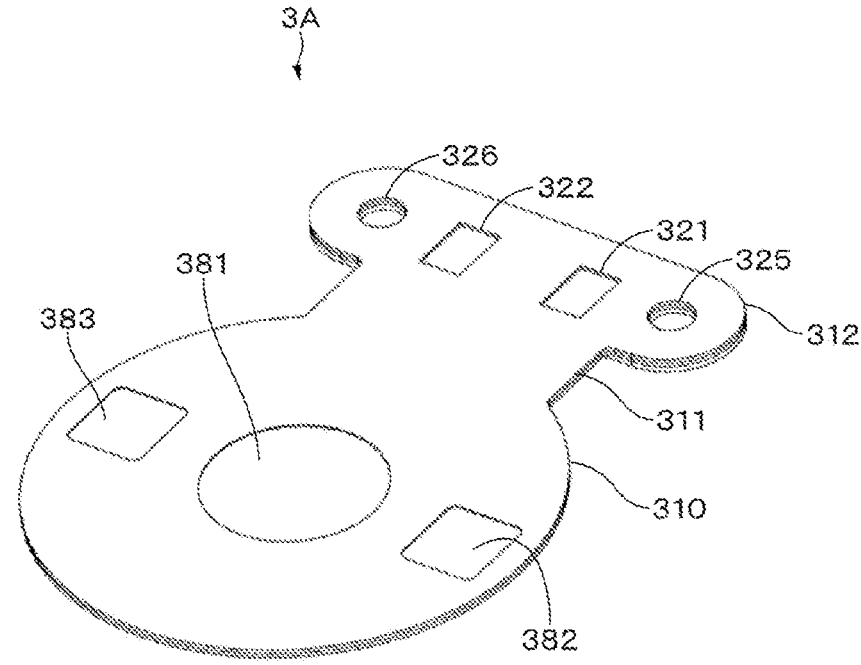
FIG. 7 is a diagram for describing a modification.

The FPC 3 in an embodiment described above may be the FPC 3A shown in FIG. 7. The FPC 3A has, in the base part 310, a copper foil 381 formed at the center part and copper foils 382 and 383 formed outside the copper foil 381. The copper foil 381 corresponds to the first connection part, and the copper foils 382 and 383 each correspond to the second connection part, where an opening is not formed in a portion where each copper foil is formed.

The copper foil 381 is connected to the positive electrode terminal 110, and the copper foils 382 and 383 are connected to the negative electrode terminal 120. As described above, the first connection part and the second connection part do not necessarily have the opening. Note that the copper foils are connected by laser welding, ultrasonic welding, resistance welding, or the like.

In an embodiment described above, laser solder welding, laser welding, ultrasonic welding, resistance welding, or the like may be used instead of the solder connection.

In an embodiment described above, the first external terminal may be a negative electrode, and the second external terminal may be a positive electrode. In addition, in an embodiment described above, the configuration corresponding to the insulating part may be an insulating member of the FPC 3, that is, a PI film, instead of the first insulating plate 2. In addition, in an embodiment described above, the circuit board may be an insulation-coated metal plate instead of the FPC 3. Further, in an embodiment described above, the rivet 140 may not be provided. The shape of the metal exterior part 101 is not limited to the columnar shape, and may be other shapes such as a prismatic shape. In addition, an integrated circuit (IC) that performs a known protection operation for the battery pack 10 may be mounted on the FPC 3.

The matters described in an embodiment and the modification described above can be appropriately combined. In addition, the materials, processes, and the like described in an embodiment are merely examples, and the contents of the present application are not limited thereto.

The battery pack according to the present application can be mounted on various electronic devices such as wireless earphones, electric tools, electric vehicles, and the like, or can be used for supplying electric power thereto.

A specific application example is described. For example, the battery pack described above can be used as a power source for a wearable device having a function of a portable information terminal, a so-called wearable terminal. Examples of the wearable terminal include a wristwatch-type terminal and a glasses-type terminal, but are not limited thereto.

Figure 8:
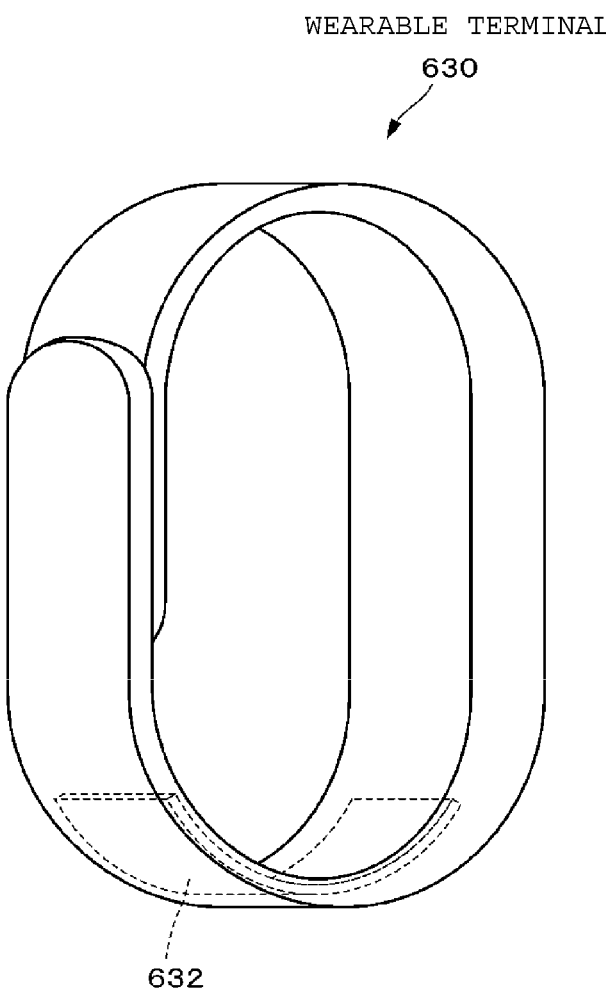
FIG. 8 is a diagram for describing an application example.

FIG. 8 shows an example of a wearable terminal incorporating the battery pack. As shown in FIG. 8, the wearable terminal 630 according to the application example is a wristwatch-type terminal, and includes a battery pack 632 therein. The battery pack according to the present application can be applied as the battery pack 632. The wearable terminal 630 can be worn and used by a user. The wearable terminal 630 may be a deformable flexible terminal.

Figure 9:
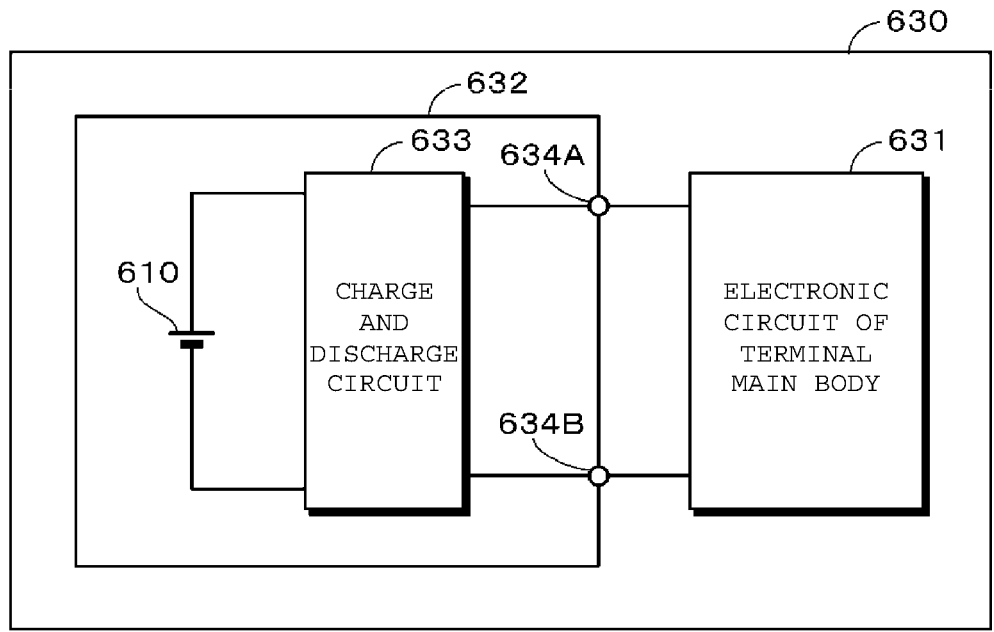
FIG. 9 is a diagram for describing the application example.

As shown in FIG. 9, the wearable terminal 630 according to the application example includes an electronic circuit 631 of an electronic device main body and a battery pack 632. The battery pack 632 is electrically connected to the electronic circuit 631. The wearable terminal 630 has, for example, a configuration in which the battery pack 632 is detachable by the user. Note that the configuration of the wearable terminal 630 is not limited thereto, and the battery pack 632 may be built in the wearable terminal 630 so that the user cannot remove the battery pack 632 from the wearable terminal 630.

When the battery pack 632 is charged, a positive electrode terminal 634A and a negative electrode terminal 634B of the battery pack 632 are respectively connected to a positive electrode terminal and a negative electrode terminal of a charger (not illustrated). On the other hand, when the battery pack 632 is discharged (when the wearable terminal 630 is used), the positive electrode terminal 634A and the negative electrode terminal 634B of the battery pack 632 are respectively connected to a positive electrode terminal and a negative electrode terminal of the electronic circuit 631.

The electronic circuit 631 includes, for example, a central processing unit (CPU), a peripheral logic unit, an interface unit, a storage unit, and the like, and controls the whole of the wearable terminal 630.

The battery pack 632 includes an all-solid-state battery cell 610 (all-solid-state battery 13 in an embodiment) and a charge and discharge circuit 633.

DESCRIPTION OF REFERENCE SYMBOLS

1: Secondary battery
2: First insulating plate
3: FPC
4: Second insulating plate
10: Battery pack

101: Metal exterior part
110: Positive electrode terminal
120: Negative electrode terminal
201: Opening (Third opening)
202, 203: Opening (Fourth opening)
301: Connection part (First connection part)
302, 303: Connection part (Second connection part)
321, 322: Connection terminal
352: Opening (First opening)
363, 364: Opening (Second opening)

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery pack comprising:
a secondary battery; and
a circuit board, wherein
the secondary battery includes:
    a metal exterior part;
    a first external terminal disposed at a center part of an end surface of the metal exterior part; and
    a second external terminal disposed so as to surround a periphery of the first external terminal, the circuit board includes:
    a first connection part connected to the first external terminal;
    a second connection part connected to the second external terminal; and
    an insulating substrate interposed between the first connection part and the second connection part,
the battery pack comprising an insulating part that insulates the first connection part from the second connection part, and the first connection part, the second connection part, and the insulating substrate being disposed in an identical plane.

2. The battery pack according to claim 1, wherein
the circuit board includes a flexible printed circuit (FPC) or an insulation-coated metal plate.

3. The battery pack according to claim 1, wherein
the insulating part is a polyimide film or non-woven fabric.

4. The battery pack according to claim 1, wherein
the first connection part includes a first opening,
the second connection part includes a second opening, and
the insulating part includes a third opening provided at a position corresponding to the first opening and a fourth opening provided at a position corresponding to the second opening.

5. The battery pack according to claim 1, wherein
the circuit board has an opposite surface to a surface in contact with the insulating part, the opposite surface having at least a part being covered with another insulating part different from the insulating part.

6. The battery pack according to claim 5, wherein
the other insulating part is a polyimide film or non-woven fabric.

7. The battery pack according to claim 1, wherein
the circuit board includes a connection terminal connected to an external device.

8. The battery pack according to claim 7, wherein
the connection terminal is provided on an identical substrate with the circuit board.

9. The battery pack according to claim 1, wherein
the metal exterior part has a columnar shape.

10. An electronic device comprising the battery pack according to claim 1.

* * * * *